UNITED STATES PATENT OFFICE.

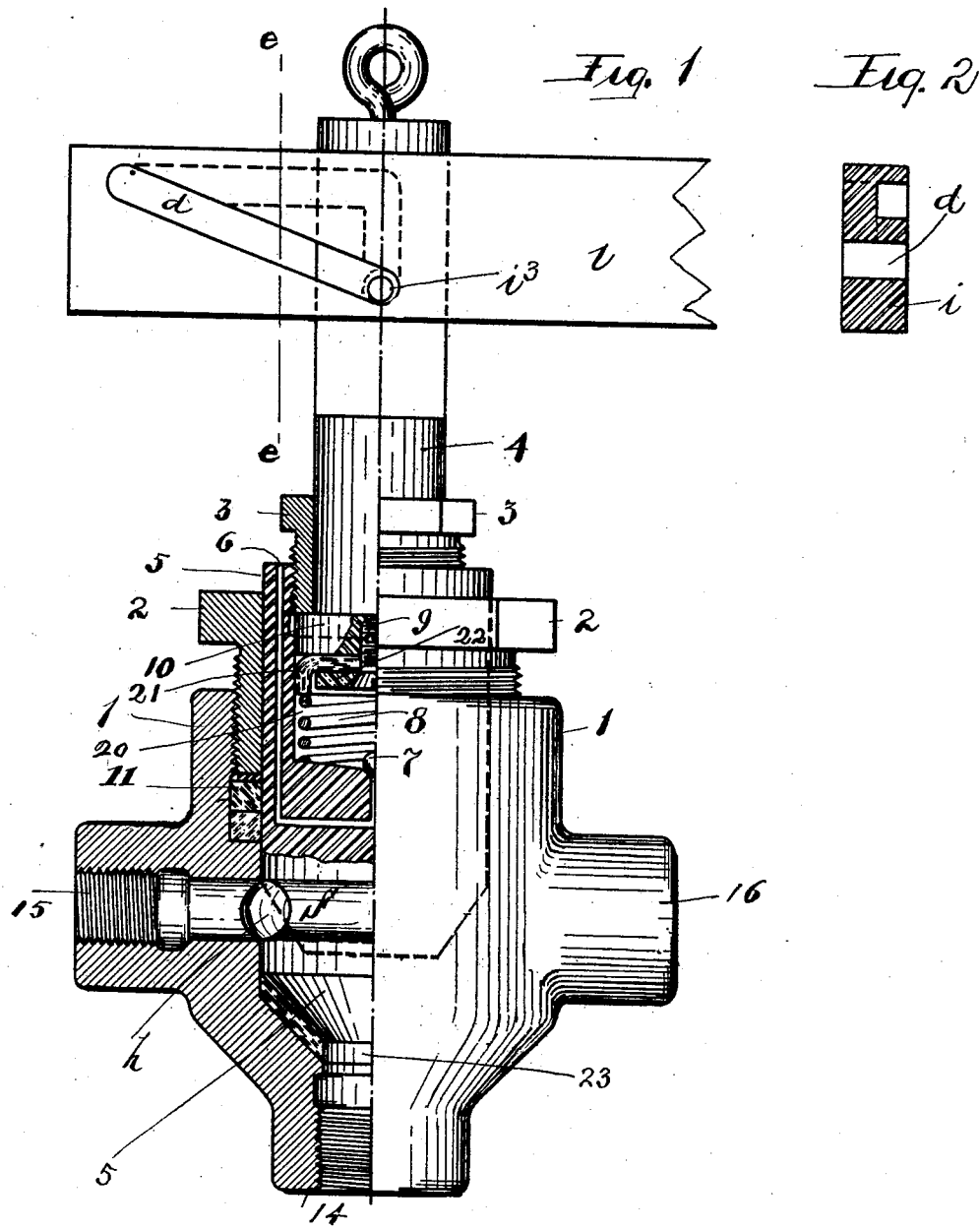

WILLIAM G. CHRYST, OF PHILADELPHIA, PENNSYLVANIA.

HYDRAULIC VALVE.

No. 796,896.     Specification of Letters Patent.     Patented Aug. 8, 1905.

Application filed October 18, 1904. Serial No. 228,917.

*To all whom it may concern:*

Be it known that I, WILLIAM G. CHRYST, a citizen of the United States, residing at Philadelphia, in the county of Philadelphia and State of Pennsylvania, have invented certain new and useful Improvements in Hydraulic Valves, of which the following is a specification.

This invention is an improvement in valves, and relates more especially to that class of valves which are employed in connection with presses operated by fluid-pressure.

The principal objects of the invention are to provide a valve which shall be simple in construction, effective in application, and easily operated.

Other objects and advantages of the invention will hereinafter appear, and what I claim as novel will be more particularly set forth in the appended claim.

In the accompanying drawings, Figure 1 is an elevation, partly in section, showing a valve constructed in accordance with my present invention. Fig. 2 is a sectional view through the operating-slide on the line $e\ e$ of Fig. 1.

Referring to the drawings, and especially to Fig. 1 thereof, 1 designates the valve-casing, which is provided at opposite sides with openings 15 and 16 and at its lower end with an opening 14, the latter communicating with the compressor, (not shown,) while the opening 15 communicates with the fluid-pressure supply and the opening 16 with another similar valve. These openings all extend into the valve-chamber, and the wall of the latter is provided at one side with a groove or channel $h$, extending from the opening 15 to the opening 16, the purpose of which groove or channel will be hereinafter explained. In the lower part of the valve-chamber, below the plane of the openings 15 and 16 and disposed at the upper end of the opening 14, is a removable valve-seat 23, comprising a dished washer or packing against which the valve-plug seats. The upper part of the valve-casing or opening which forms the valve-chamber is countersunk, as shown, to receive the packing-rings 11 and collar 2, the latter being threaded in the casing against said packing.

5 designates the valve-plug, which extends through the collar 2 and is beveled at its lower end to correspond with the face of the valve seat or packing 23 and fit closely against the same when the valve is closed. The valve-plug 5 is provided peripherally with a channel or groove $f$, which when the valve is closed registers with the groove or channel $h$ in the valve-casing and provides a passage around the plug from the inlet-opening 15 to the opening 16, whereby the fluid-pressure may pass on to the next valve when this valve is closed.

Connected to the valve-plug 5 is an operating-stem 4, which is actuated in the present instance by means of a slide $i$, having an inclined slot $d$, in which latter travels a pin $i^3$, projecting from the valve-stem. In this manner it will be noted that when the slide $i$ is moved to the right the pin $i^3$ travels up the inclined slot $d$ and opens the valve, and when moved in the opposite direction the pin travels down the slot and closes the valve. The slide is operated by any of the mechanisms commonly used in presses employing this style of valve.

To provide a yielding connection between the valve-stem and the plug, so that the latter may be pressed closely against its seat and held under tension, a coiled spring 8 is interposed between said valve stem and plug. To provide for this, the upper part of the valve-plug is recessed to receive the coiled spring, and into this recess above the spring slides the head 10, which is formed at the lower end of the valve-stem and in its downward movement presses against the spring to close the plug on its seat, while on its upward movement to open the valve it engages a collar 3, which latter encircles the shank of the valve-stem and is threaded in the valve-plug. The travel of the valve-stem is such that when forced downward by the inclined slot in the operating-slide $i$ it will not only close the plug 5 upon its seat, but will also exert a tension on the spring 8 sufficiently to hold said valve firmly upon such seat and prevent leakage. As shown, the spring 8 bears against an edge of a packing 21, which latter is connected to the valve-stem by the screw 9 and washer 22 and bears against the walls of the recess in the valve-plug to form a tight joint. To admit air into the lower part of the recess below the end of the valve-stem, and thereby permit a full opening movement of the valve, a vent-opening 6 extends through the valve-plug, as shown, and opens into the recess at the center of the inclined bottom thereof, such vent being closed automatically by a ball 7.

The collars 2 and 3 are provided with the usual flat faces, as shown, to receive a wrench for properly adjusting the same, and the openings 14, 15, and 16 are internally threaded to receive the usual pipe connections.

The operation of the valve will be readily understood from the foregoing description, in connection with the drawings thereof, for upon the full upward movement of the plug, as indicated in dotted lines, communication will be established between the inlet-opening 15 and the discharge-opening 14, as well as with the opening 16, which leads to the next valve, so that the fluid-pressure may pass by way of the opening 14 to the compressor with which it connects. In closing the valve the stem 4 descends and carries with it the plug 5, which latter passes below the opening 15 and becomes seated on the packing 23, against which latter it is held under tension by means of the spring 8, so as to prevent leakage to the opening or passage 14, and as said packing is located some distance below the plane of the opening 15 there is no chance of the fluid-pressure getting under the valve-plug and raising it. When the valve is closed, the fluid-pressure may pass around the plug to the opening 16, so as to pass on to the next valve.

Having described my invention, I claim—

In a valve, the combination with the valve-casing having openings at right angles to each other and a vertical chamber opening out at the upper end of the casing and countersunk, packings in the lower end of the countersunk portion of the chamber and a collar threaded in the upper end thereof, a plug slidable in the chamber and collar and having a recess in its upper end, a valve-stem having a head at its lower end slidable in the recess of the plug, a packing attached to the head and bearing against the sides of the recess, a spring interposed between the head and bottom of the recess, a vent-opening leading into the bottom of the recess in the plug, and a valve for said vent-opening, as herein shown and described.

In testimony whereof I affix my signature in presence of two witnesses.

WILLIAM G. CHRYST.

Witnesses:
H. A. HERR,
JOSEPHINE M. KELLY.